F. L. Bailey.
Car Replacer.

N° 13,417.  Patented Aug. 14, 1855.

Witnesses:
J. Vernon
D. R. Cole

Inventor:
Fortune L. Bailey

UNITED STATES PATENT OFFICE.

FORTUNE L. BAILEY, OF FREEPORT, INDIANA.

APPARATUS FOR REPLACING CARS.

Specification of Letters Patent No. 13,417, dated August 14, 1855.

*To all whom it may concern:*

Be it known that I, FORTUNE L. BAILEY, of Freeport, in the county of Shelby and State of Indiana, have invented a new or Improved Mode of Replacing Railroad-Cars on the Track; and I do hereby declare that the same is fully described and represented in the following specification and accompanying drawings and letters of reference marked thereon.

Figure 1:
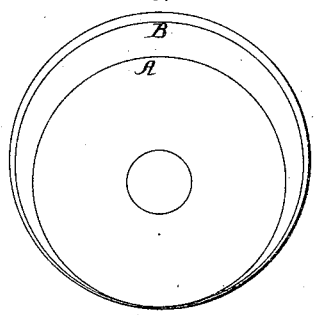
Figure 2:
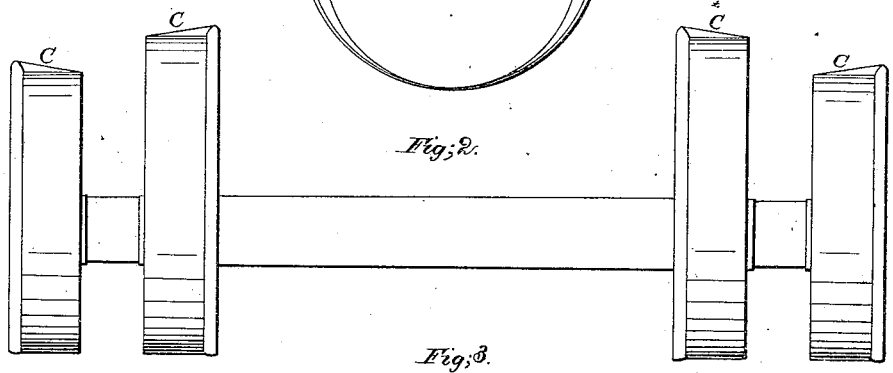
Figure 3:
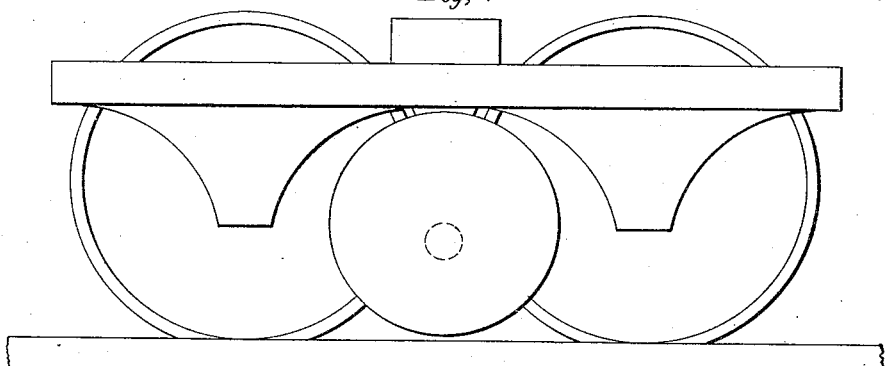
Figure 4:
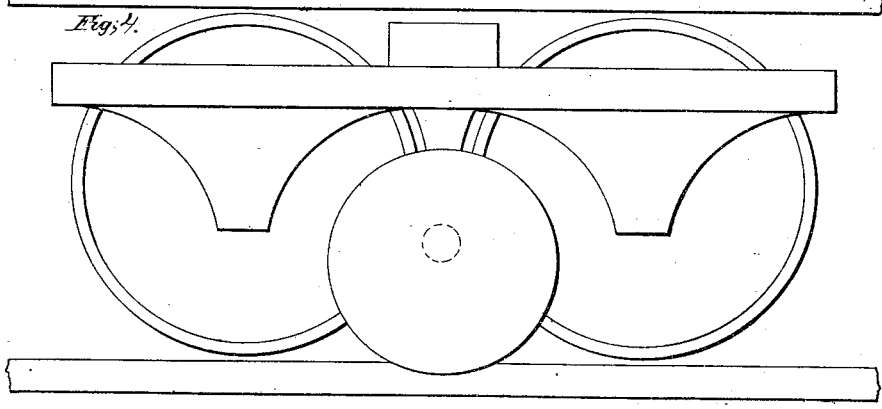

Of the said drawings, Figure 1 represents a side view of my improved safety wheel showing the variation of the wheel from a perfect circle to a cam shape; Fig. 2 is a plan showing how the wheels may be applied to the shaft or axle; Fig. 3 describes the wheel as applied to a car; Fig. 4 is a side view of my wheel as applied to a set of trucks and in the act of replacing the car on the track.

In the said drawings the line at A exhibits a perfect circle; B shows the variation of the wheel from a perfect circle to a cam shape, as from A to B, which may vary according to the size of the wheel; the flange is small if any at the short side of the wheel and gradually increases toward the upper or long side and extends near or quite across the edge of the wheel at the long side, forming a sloped or scroll flange, as at the line at C in Fig. 2. This wheel is so constructed that the short side is much the heaviest and when applied to a shaft or axle will balance with the short side down and will remain in that position in readiness for action at any moment. The sloped or scroll flange should be sufficiently sloping, as shown at C, that were the car standing still, as in Fig. 4, the weight of the car on the sloped flange would slide the car sidewise a sufficient distance to place the car on the track.

Fig. 2 is a plan showing how the wheels may be applied to a shaft or axle, also showing the inside wheel to be the largest the shaft or axle should be much like the common axle but of sufficient size and strength to bear the weight of the car.

Fig. 3 describes a set of trucks with my safety wheel thereto applied showing the position of the safety wheel when the car is on the track. The safety wheel is at a sufficient height from the track to pass over without coming in contact with anything necessary for the track.

Fig. 4 is a side view of a set of car trucks with my safety wheel thereto applied in the act of replacing the car on the track; when a car or engine is thrown or runs off the track the short side of the safety wheel is the first to come in contact with the railing and as the wheel advances the car or engine is gradually raised to a sufficient height when the sloped or scroll flange of the safety wheel acts on the railing and immediately slides or draws the car on the track.

The frame for the trucks is constructed with a brace bar or sliders to keep the frame and trucks level with the car in order that the wheels may all pass over at the same time. Should an axle or wheel of the car be broken the slides will prevent the car from settling to the ground. When a car runs off the inside safety wheel being the largest and will gain on the smaller, inclines the car to run on the track, but should it not the curved flange will act on the railing and force it on. Engines, freight or passenger cars with these wheels when thrown from the track will be immediately replaced on the railing without damage or delay; should the railing spread the safety wheels would force it back to its proper place and the train would then pass without damage.

I do not claim the use of cams for lifting the cars merely; for I am aware that has been done; but What I do claim as my invention and desire to secure by Letters Patent is—

The arrangement of eccentric wheels on either side of the rails, the outer ones being slightly smaller than the inner ones, so counterpoised that the smaller portion of said eccentrics shall remain downward when not in use, for the purpose of lifting and directing the cars on to the track, when they have been thrown off; by rolling upon said eccentric wheels, substantially as herein described.

In testimony whereof I have hereunto set my signature this 6th day of December 1854.

FORTUNE L. BAILEY.

Witnesses:
   I. VERNON,
   J. R. COLE.